INTERCEPT DISCRIMINATOR

Filed March 12, 1953 2 Sheets-Sheet 1

INVENTOR.
H. L. HORWITZ
G. L. HASSER
BY E. D. Phinney
ATTORNEY

DISCRIMINATOR CIRCUIT

INVENTOR.
H. L. HORWITZ
G. L. HASSER
BY
[signature]
ATTORNEY

United States Patent Office 2,871,300

Patented Jan. 27, 1959

2,871,300

INTERCEPT DISCRIMINATOR

Henry Leopold Horwitz, Nutley, and George Louis Hasser, Packanack Lake, N. J., assignors to International Telephone and Telegraph Corporation, a corporation of Maryland Application March 12, 1953, Serial No. 341,856

13 Claims. (Cl. 179—27)

Figure 1:
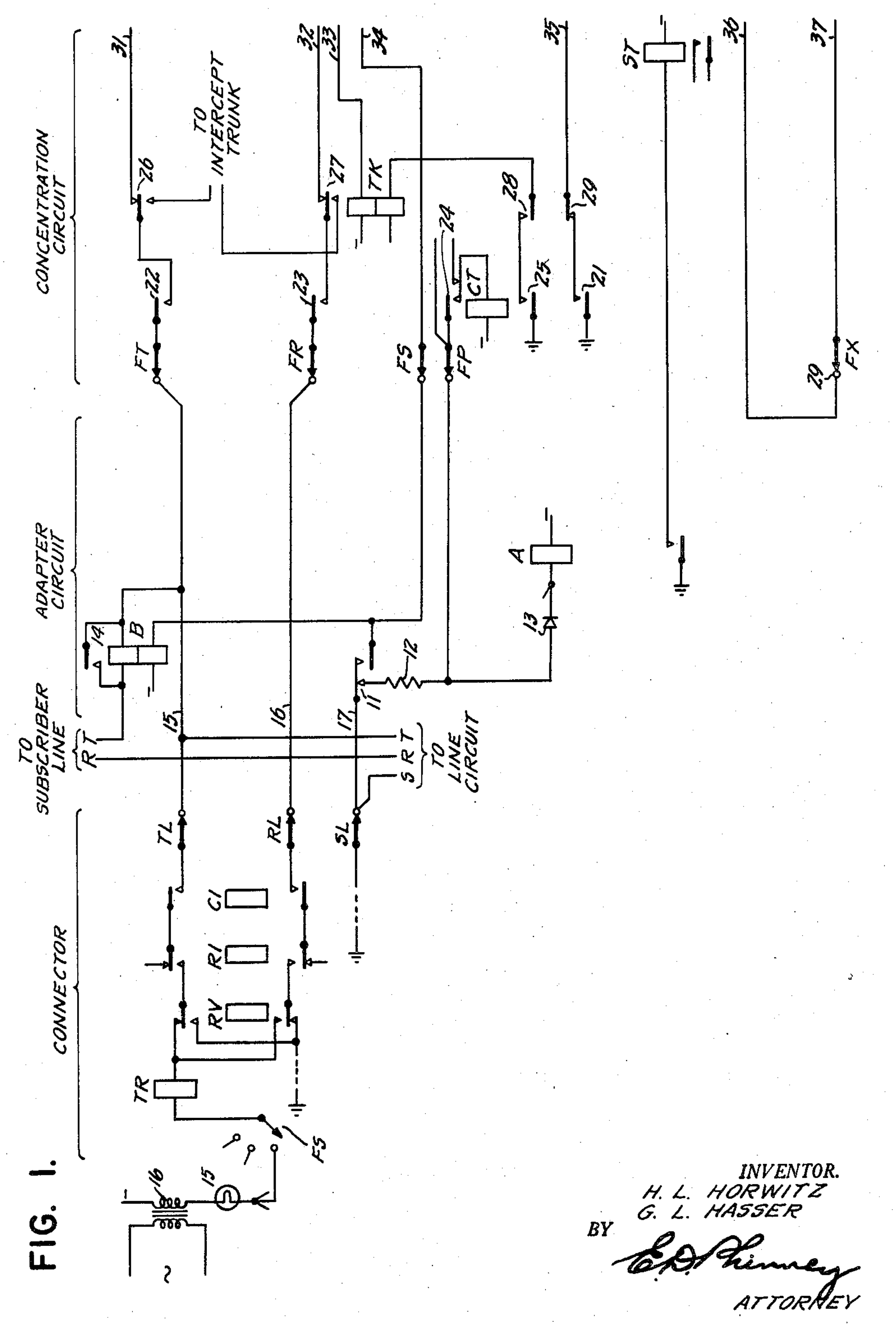

This invention relates to telephone systems and more particularly to improvements in circuits for providing call intercept service in automatic telephone systems wherein a proportion of the subscriber lines are of the party line type.

As explained in Patent No. 2,426,210, to William Hatton, granted August 26, 1947, in automatic telephone systems, when one or more of the sub-stations associated with a multiparty subscriber's line is taken out of service or disconnected from the line, it is desirable to provide an arrangement whereby calls intended for the disconnected sub-station are routed to an intercepting trunk so that the calling subscriber can be informed that the called sub-station is no longer in service.

It is one object of the present invention to provide improved circuits of the character described, which are simple and economical and which function in a positive and reliable manner to intercept calls to one or more predetermined sub-stations on party lines, and to extend automatically the intercepted calls to a common intercept trunk in order that the calling party may be informed that the called station is out of service.

Another object of our invention is to provide an improved method of identifying intercepted calls on multiparty lines.

According to one feature of our invention an intercept discriminator to which a called party line with one or more out of service stations is extended, comprises a set of test relays adapted to respond selectively to characteristic ringing currents applied to the line and a chain of further relays which connect up in sequential order only those test relays which correspond to out of service stations, calls to out of service stations being extended to an intercept trunk under the control of the test relays.

Other objects, purposes and characteristic features of our invention will be apparent from a study of the accompanying drawings in conjunction with the following description.

Since the invention is concerned primarily with the final selector stage of an automatic telephone switching system, only those parts of such a system are shown as are required to understand a preferred method of practicing the invention.

In the drawings:

Fig. 1 represents in a schematic form the circuits used in establishing an intercept call including parts of a connector, a subscriber's line, an adapter for the subscriber's line and a concentration circuit.

Figure 2:
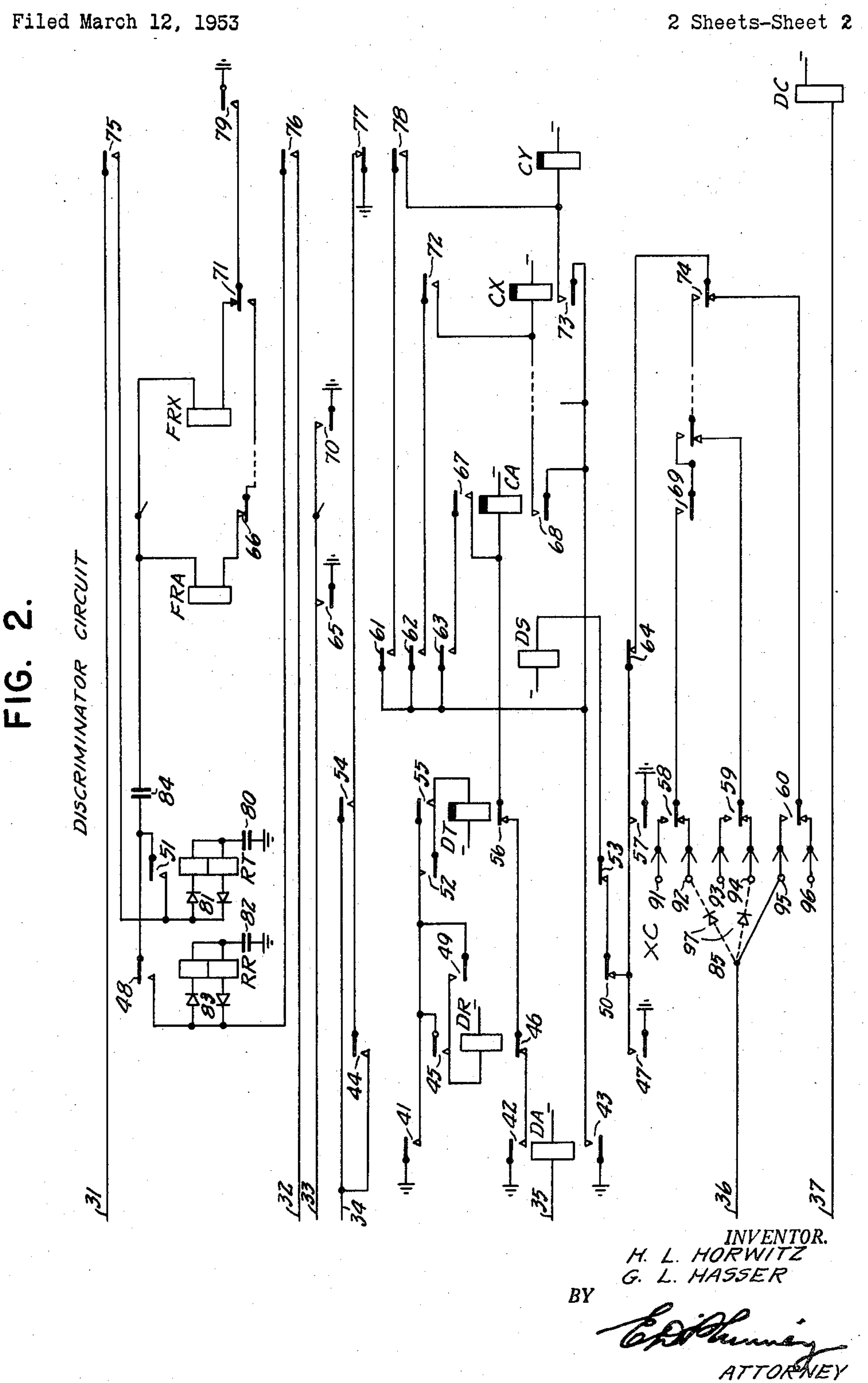

Fig. 2 which should be placed on the right of Fig. 1 represents a discriminator circuit which in connection with the concentration circuit and an adapter circuit, identifies those calls which are to be intercepted and extended to the intercept trunk, and for all other calls disconnects the discriminator and concentration circuit.

While certain features of the invention are broadly applicable to any type of party line telephone system, it will be assumed that the invention is applied to a party line telephone system in which several different frequencies are employed for selectively ringing the bells on a selected party line. It is also assumed that the lines in the particular system to which this invention is applied are divided circuit ringing lines, with several stations selected by ringing over one side of the line to ground and with several additional stations selected by ringing over the other side of the line to ground.

It is believed that the invention will be best understood by explaining the operation when a connection is made to the line circuit illustrated in Figure 1, assuming that a ringing current of a particular frequency is applied to the line, that the station which responds to this frequency has been disconnected, and that the call should be routed to an intercept trunk in order that the calling subscriber may be informed that the called station is out of service.

Figure 1 shows a portion of a connector of a type well known in the art and comprising a cut-through relay C1, a ringing relay R1, a reversing relay RV, a trip relay TR, a frequency selecting minor switch FS and connector wipers TL, RL and SL. It will be understood that the connection from the calling line to the called line is made in the usual manner through the connector by way of the tip line wiper TL and the ring line wiper RL, with the sleeve line wiper SL of the connector applying ground to the sleeve terminal of the called line circuit for making this line busy and for operating the cut-off relay. After the called line is selected, it is usually the practice to dial a station selecting digit which operates the frequency selecting switch FS to select the proper frequency for ringing the desired station. Furthermore, the reversing relay RV, associated with the connector, may be left in its normal position for ringing over the tip side of the line or it may be operated for ringing over the ring side of the line. It is also well known by those skilled in the art how cut-in relay C1 is operated after the line is selected, how ringing relay R1 is operated to ring the called line and how trip relay TR is operated for releasing R1 to disconnect the line from the ringing circuit and for connecting it through to the talking circuit, including the calling line.

The concentration circuit, a part of which is illustrated in Figure 1, is well known to those skilled in the art and comprises a start relay ST, a cut-through relay CT, a transfer relay TK and a finder switch. It will be understood that the finder switch operates in well-known manner to extend connections from subscribers' lines requiring intercept services to a discriminator and intercept trunk. The start relay ST causes the finder switch to engage a calling line adapter circuit, relay CT extends the connection to the discriminator circuit and relay TK transfers the connection to an intercept trunk.

The discriminator circuit is shown in a simplified form in Figure 2. Two sets of relays FRA—FRX and CA—CX are provided for the purpose of comparing the frequency of the ringing current transmitted with the frequency to be intercepted. Relays FRA—FRX are each responsive to a particular ringing frequency and when operated indicate that a call shall be intercepted. One or more of these relays will be connected to a subscriber's line, in a sequential order, by means of the cascade relays CA—CX, which in turn are controlled by jumpering on the cross connecting frame XC. When a station is to be intercepted the circuits will be prepared as follows: An adapter circuit will be connected to a subscriber's line to be intercepted, by means of conductors 15, 16 and 17, and jumper wires will be provided between terminals 85 and 91—96. Terminals 85 are each connected to a terminal 29 of the concentration finder and circuit to indicate a subscriber's line, while the jumpering between a terminal 85 and one or more terminals 91—96 indicates the particular station or stations to be intercepted. It will be understood that a set of terminals such as 91—96 will be provided for each position of the concentration finder, corresponding terminals of each set being connected in common to the contacts 58, 59 and 60 of the relay DT. These terminals 91—96 are further divided into two groups, namely, odd terminals 91, 93, 95 for stations signalled via tip conductor 15 of the line and even terminals 92, 94, 96 for stations signalled via the ring conductor 16. The detailed circuit operation takes place as described presently. It may be noted that only those relays and connections are shown which are required to illustrate the invention. It is to be understood that in practice equipment will be supplied in accordance with the maximum numbers of stations provided for multi-party lines, It will now be assumed that the line circuit illustrated in Figure 1 has been selected, that ringing current of a particular frequency is selected and that the station responsive to this frequency has been disconnected. Further, that the subscriber's line is connected to an adapter circuit which in turn is connected to a set of terminals on the finder switch of the concentration circuit. When ground is applied to the sleeve terminal in the connector a circuit is closed for relay A via contacts 11 of relay B of the adapter circuit, resistance 12, rectifier 13, winding of relay A to battery. Relay A operates and completes an obvious circuit for the starting relay ST, which causes the finder switch to hunt for and engage the line. The cut-through relay CT then energizes in known manner and shunts relay A which releases and opens the start circuit. Relay CT also at contacts 22, 23 extends to the discriminator the T and R leads of the line circuit. A circuit is further completed for relay DA (Fig. 2) from ground, contacts 21, 29, conductor 35, winding of relay DA to battery.

Relay DA operates and causes the operation of relay CA via a circuit which may be traced from ground, contacts 42 of DA, contacts 46 of DR, contacts 56 of DT, winding of CA to battery. CA is the first of a chain of relays connected in cascade and terminated by relays CX and CY. When CA operates, a circuit is completed for the succeeding relay in the series, thus causing the successive operation of the whole series. The operating circuit of the last relay illustrates the method of operation and may be traced from ground contacts 43 of DA, contacts 73 of CX, winding of CY to battery.

When relay CY operates, the T and R conductors are extended at contacts 75 and 76 from the connector to relays RT and RR. One of these circuits may be traced from ground, condenser 80, windings of relay RT, rectifiers 81, contacts 75 of CY, conductor 31, contacts 26 of TK, contacts 22 of CT, wiper FT, wiper TL, contacts of relays C1, R1, RV to ground or to the ringing current supply via winding of TR, frequency selecting switch FS, lamp 15, and secondary winding 16 of ringing transformer to battery. The other circuit via the R conductor may be traced from ground, condenser 82, windings of relay RR, rectifiers 83, contacts 76 of CY, conductor 32, contacts 27 of TK, contacts 23 of CT, wiper FR, wiper RL, contacts of C1, R1, RV to ground or to the ringing current supply over the circuit previously traced.

Relays RR and RT operate alternatively on any frequency of ringing current to indicate to the discriminator the particular talking wire over which the called party is being signalled. Assume that ringing current is transmitted over the T conductor; relay RT will operate and cause the operation of relay DT, via a circuit closed from ground contacts 41, contacts 52, winding of DT to battery. Relay DT locks via contacts 55 and prepares via contacts 58—60 a circuit for checking whether or not the call shall be intercepted. Relay DT also opens the circuit for the first cascade relay CA, which releases and in turn causes the release one after another of the other slow releasing cascade relays. Each cascade relay upon releasing prepares at contacts 66—71 a circuit for an A. C. relay FRA—FRX tuned to a particular ringing frequency. The cascade relays CA—CX also prepare via contacts 69—74 a circuit for checking or comparing a particular frequency or substation in a manner which will now be described.

As an example of the circuit operation, assume that calls to a particular party on the subscriber line are required to be intercepted. Assume further that this party is signalled via the T conductor of the party line, and by the particular ringing frequency to which A. C. relay FRX responds. To indicate that calls to the particular party are to be intercepted, a connection has been made between terminals 85 and 95 on the cross connection terminal frame XC.

Now when a ringing current is transmitted via the T conductor, relays RT and DT operate and the cascade relays CA—CX, CY release one after another, as previously described. When CX closes its back contacts 74 a circuit is completed for a relay D. C. from ground via contacts 57 of DT, 64 of DS, 74 of CX, 60 of DT, jumpering wire from 95 to 85, conductor 36, terminal 29 of the finder switch of the concentration circuit, wiper FX, conductor 37, winding of relay D. C. to battery; relay D. C. operates and completes a circuit for relay FRX from ground, via contacts 79 of D. C., 71 of CX, winding of FRX, condenser 84, contacts 51 of RT, 75 of CY via conductor 31 to the ringing current supplied from the connector via a circuit previously traced.

Since the frequency of the ringing current corresponds to that of the tuned relay FRX the relay operates and completes a circuit for the transfer relay TK in the concentration circuit. This circuit may be traced from ground via contacts 70 of FRX, conductor 33, upper winding of TK to battery. Relay TK operates and locks over its lower winding via its contacts 28 and contacts 25 of CT. TK opens at contacts 29 the circuit for relay DA, which in turn causes the release of all relays in the discriminator circuit. Relay TK also transfers the T and R conductors of the line to the intercept trunk, which may be of any type well known to the art. The call may be terminated at an operator's position or a tone may be transmitted, thus informing the calling subscriber that the called party is out of service.

When the calling subscriber releases, ground is removed from the S conductor of the line circuit which in turn causes the release of all relays in the concentration circuit.

When calls are made to other parties on the line, which are not to be intercepted, the ringing current will be of a frequency to which A. C. relay FRX does not respond. Thus all the cascade relays release and relay CY upon releasing completes a circuit for relay B in the adapter circuit, from ground via contacts 77 of CY, 54 of DT (or 44 of DR), conductor 34, wiper FS of the concentration finder switch, lower winding of relay B to battery. Relay B locks via contacts 11 to the grounded S conductor of the line and also opens at contacts 11 the circuit of relay CT which in turn causes the release of the discriminator circuit.

When the party to be intercepted is signalled via the R conductor, the circuit operation takes place in a similar manner but relays RR and DR operate in place of RT and DT. Further, the circuit for operating relay D. C. should be prepared by jumpering the corresponding cross connecting terminals 92, 94, 96, etc., on the frame XC in accordance with the ringing frequency to be checked.

If a plurality of parties on a multiparty line are to be intercepted, jumpering will be provided for the ringing frequency of each party, and further a rectifier or other form of uni-directional conducting device will be inserted in every jumper wire, so as to prevent interference by other party lines. The jumpering between terminals 85, 92, 94 and rectifiers 97 illustrates the jumpering required for the interception of two parties.

The ringing frequencies are checked during the time ringing current is transmitted from the connectors and when the ringing current is interrupted the cascade relays CA—CX, which happen to be operated, are prevented from releasing in the following manner: When the ringing current is interrupted, relay RT (or RR) releases thereby completing a circuit for relay DS from ground via contacts 47 of DR (or 57 of DT), 50 of RR, 53 of RT, winding of DS to battery. Relay DS at contacts 61, 62, 63 supplies a locking ground from contacts 43 to the cascade relays in the same way as illustrated for relays CA, CX and CY. When ringing is again transmitted RT (or RR) operates and DS releases thus causing the circuit to function as previously explained.

If a call is made to a party not requiring intercept service, the party may answer while the intercepting circuits are connected to the called line. In this case relay B of the adapter circuit will be operated over the subscriber's line. Relay B locks to a ground supplied from a connector via the S conductor and short circuits its upper operating winding in order to reduce transmission loss in the talking circuit. Moreover, the circuit for relay CT is opened at contacts 11, thus causing the release of the common intercept circuits.

On calls originated on a multi-party line, relay B operates in series with the usual line relay and locks via the S conductor to the succeeding equipment. Relay B opens the circuit for the starting relay A thus preventing the functioning of the common intercept circuits on incoming calls.

While we have described our preferred embodiment of our invention it is to be understood that various modifications and changes may be applied to meet the requirements of practice without departing from the spirit or scope of our invention as claimed in the appended claims.

What is claimed is:

1. An intercept system for telephone party lines comprising means for selectively signalling stations on said lines, an intercept discriminator, means for extending a called party line to said discriminator, a set of test relays in said discriminator adapted to respond selectively to selective ringing currents, means for connecting one terminal of said test relays to said line and a chain of further relays in said discriminator for completing in sequential order the circuits of only those test relays which correspond to stations out of service.

2. An intercept system for telephone party lines comprising means for applying selective ringing currents of different frequency to said lines, an intercept discriminator, means for extending a called party line to said discriminator, a set of tuned relays in said discriminator adapted to respond selectively to said selective ringing currents of different frequencies, means for connecting one terminal of said tuned relays to said line, a chain of further relays in said discriminator for completing in sequential order the circuits of only those tuned relays which correspond to stations out of service, an intercept trunk, and means under the control of said tuned relays for extending the connection to said intercept trunk.

3. An intercept system for telephone party lines comprising means for applying selective ringing currents of different frequency to said lines, an intercept discriminator, a finder for extending a called party line to said discriminator, a set of tuned relays in said discriminator adapted to respond selectively to said selective ringing currents of different frequencies, means for connecting one terminal of said tuned relays to said line, a chain of further relays in said discriminator, means for energizing in succession the relays of said chain when said called party line is extended to said discriminator, means responsive to the application of ringing current to said line for initiating the successive deenergization of the relays of said chain, and means controlled by said finder and by the deenergization of the relays of said chain of further relays for completing only those circuits of the tuned relays which correspond to out of service stations.

4. An intercept system, according to claim 3, further comprising an intercept trunk and a further relay for transferring said party line from said discriminator to said intercept trunk, and circuits for said further relay including contacts of said tuned relays.

5. In an automatic telephone switching system, party lines, means for extending connections to said party lines, an intercept discriminator, a finder switch for extending a connection from a called party line to said discriminator when a call is made to a party line, means for applying ringing currents of different frequency to said party line, a first set of tuned relays in said discriminator adapted to respond selectively to said ringing currents of different frequency, means for connecting one terminal of said tuned relays to said line, a second set of relays in said discriminator connected in cascade, a cross-jumpering frame including a first terminal connected to a bank contact of said finder and other terminals corresponding in number of the full complement of stations on the called party line connected to contacts of the relays of said second set of relays, a further relay, a connection from said further relay to a wiper of said finder adapted to engage said bank contact, a jumper wire connected between said first terminal and each of said second terminals which corresponds to an out of service station on the party line, and circuits for said tuned relays including contacts of the relays of said second set and make contacts of said further relay whereby said further relay operates to complete the circuit of said tuned relays only for those relays of said second set which correspond to out-of-service stations of said party line.

6. An automatic telephone switching system, according to claim 5, further comprising a uni-directional conducting device connected in each jumper wire.

7. An automatic telephone switching system, according to claim 5, further comprising a holding relay, a circuit for said holding relay adapted to be closed during interruptions of said ringing currents, contacts for said holding relay, and locking circuits for the relays of said second set extending over said contacts.

8. In an automatic telephone switching system, party lines, means for extending connections to said party lines, an intercept discriminator, switching means for extending a connection from a called party line to said discriminator when a call is made to a party line, means for applying ringing currents of different character to said party line, a first set of relays in said discriminator adapted to respond selectively to said ringing currents of different character, and a second set of relays in said discriminator connected in cascade for operatively and successively connecting to said line only those of said first set of relays which correspond to stations out of service.

9. In an automatic telephone switching system, party lines, means for extending connections to said party lines, an intercept discriminator, a finder switch for extending a connection from a called party line to said discriminator when a call is made to a party line, means for applying ringing currents of different frequency to said party line, a first set of tuned relays in said discriminator adapted to respond selectively to said ringing currents of different frequency, means for connecting one terminal of said tuned relays to said line and a second set of relays in said discriminator connected in cascade for successively completing the circuits of only those of said first set of relays which correspond to stations out of service.

10. In an automatic telephone switching system, party lines, means for extending connections to said party lines, an intercept discriminator, a finder switch for extending a connection from a called party line to said discriminator when a call is made to a party line, means for applying ringing currents of different frequency to said party line, a first set of tuned relays in said discriminator adapted to respond selectively to said ringing currents of different frequency, means for connecting one terminal of said tuned relays to said line, a second set of relays in said discriminator connected in cascade, and means controlled by said finder and said second set of relays for completing in a sequential order the circuits of only those tuned relays which correspond to out of service stations.

11. In an automatic telephone switching system, party lines, means for extending connections to said party lines, an intercept discriminator, a finder switch for extending a connection from a called party line to said discriminator when a call is made to a party line, means for applying ringing currents of different frequency to said party line, a first set of tuned relays in said discriminator adapted to respond selectively to said ringing currents of different frequency, means for connecting one terminal of said tuned relays to said line, a second set of relays in said discriminator connected in cascade, a further relay in said discriminator, circuits for said further relay including a wiper of said finder switch and contacts of said second set of relays, and circuits for each of said tuned relays including make contacts of said further relay whereby said further relay operates to complete the circuit of said tuned relays only for those relays of said second set which correspond to out-of-service stations of said party line.

12. In an automatic telephone switching system, party lines, means for extending connections to said party lines, an intercept discriminator, a finder switch for extending a connection from a called party line to said discriminator when a call is made to a party line, means for applying ringing currents of different frequency alternatively to one or the other side of the party line, a first set of tuned relays in said discriminator adapted to respond selectively to said ringing currents of different frequency, means for connecting one terminal of said tuned relays to that side of the line to which ringing current is applied, and a second set of relays in said discriminator connected in cascade for completing in sequential order the circuits of only those of said tuned relays which correspond to out of service stations.

13. In an automatic telephone switching system having party lines and means for extending connections to said party lines, the combination comprising an intercept discriminator, a finder switch for extending a connection from a called party line to said discriminator when a call is made to said called party line, means for applying ringing currents of different frequency alternatively to one or the other side of said party line, a first set of tuned relays in said discriminator adapted to respond selectively to said ringing currents of different frequency, means for connecting said tuned relays to that side of the line to which ringing current is applied, a second set of relays in said discriminator connected in cascade, a change-over relay comprising back, front and movable contacts and arranged to be operated only when ringing currents are applied to one particular side of the line, a cross-jumpering frame including a first terminal connected to a bank contact of said finder and other terminals corresponding in number to the full complement of stations on said called party line and connected alternatively to said back and front contacts, connections from said movable contacts to contacts of said second set of relays, a further relay, a connection from said further relay to a wiper of said finder adapted to engage said bank contact, a jumper wire connected between said first terminal and each of said second terminals which corresponds to an out of service station on the party line, and circuits for said tuned relays including contacts of the relays of said second set and contacts of said further relay.

References Cited in the file of this patent

UNITED STATES PATENTS

| | | |
|---|---|---|
| 2,300,186 | Wallace | Oct. 27, 1942 |
| 2,344,634 | Powell | Mar. 21, 1944 |
| 2,426,210 | Hatton | Aug. 26, 1947 |